United States Patent
Ho

[11] Patent Number: 6,118,496
[45] Date of Patent: Sep. 12, 2000

[54] AUTO AUDIO/VIDEO OUTPUT CIRCUIT WITH MULTIPLE AUDIO/VIDEO INPUTS

[76] Inventor: Chin-Chi Ho, 1F., No.9, Lane 303, Kuei-Sui Street, Taipei, Taiwan

[21] Appl. No.: 09/033,956

[22] Filed: Mar. 3, 1998

[51] Int. Cl.[7] .................................................. H04N 5/268
[52] U.S. Cl. .......................................... 348/706; 348/705
[58] Field of Search .................................. ; 348/705, 706, 348/725, 553, 554, 555; 358/181, 188; H04N 5/268, 7/44

[56] References Cited

FOREIGN PATENT DOCUMENTS

| 59-22486 | 2/1984 | Japan | ...................................... 358/181 |
| 4-213281 | 8/1992 | Japan | .............................. H04N 5/262 |
| 4-219081 | 8/1992 | Japan | .............................. H04N 5/268 |
| 7-192443 | 7/1995 | Japan . | |

*Primary Examiner*—David E. Harvey
*Attorney, Agent, or Firm*—Dougherty & Troxell

[57] ABSTRACT

An auto audio/video output circuit with multiple audio/video inputs, the circuit having an analog/digital converter unit for convert inputted video signal into digital signal, a CPU for memorizing the sequence of inputted audio/video signals, permitting the last inputted audio/video signal to be outputted to audio/video output amplifiers for amplification and further output to a TV.

6 Claims, 4 Drawing Sheets

| audio/ video signal input | | | | | audio/ video signal output |
|---|---|---|---|---|---|
| A signal | B signal | C signal | D signal | E signal | |
| 1 | 0 | 0 | 0 | 0 | A signal |
| 0 | 1 | 0 | 0 | 0 | B signal |
| 0 | 0 | 1 | 0 | 0 | C signal |
| 0 | 0 | 0 | 1 | 0 | D signal |
| 0 | 0 | 0 | 0 | 1 | E signal |
| 0 | 0 | 0 | 0 | 0 | no signal |

FIG.3

| signal input sequence \ input signal | A signal | B signal | C signal | D signal | E signal | signal output |
|---|---|---|---|---|---|---|
| | 5 | 1~4 | 1~4 | 1~4 | 1~4 | A signal |
| | 1~4 | 5 | 1~4 | 1~4 | 1~4 | B signal |
| | 1~4 | 1~4 | 5 | 1~4 | 1~4 | C signal |
| | 1~4 | 1~4 | 1~4 | 5 | 1~4 | D signal |
| | 1~4 | 1~4 | 1~4 | 1~4 | 5 | E signal |

FIG.4

AUTO AUDIO/VIDEO OUTPUT CIRCUIT WITH MULTIPLE AUDIO/VIDEO INPUTS

BACKGROUND OF THE INVENTION

The present invention relates to an auto audio/video output circuit with multiple audio/video inputs, and more particularly to such an auto audio/video output circuit which receives inputted audio/video signals from different audio/video equipment, and selects the last inputted audio/video signal for output.

A regular audio/video output device, for example a TV, has only one set of audio/video input terminals. When connecting different audio/video equipment to a TV, a selector shall be used and connected between the TV and the audio/video equipment, so that the user can select one audio/video equipment for output to the TV. Further, a variety of audio/video equipment including DVD, VDC, video tape recorder/player, V8, video cassette recorder, etc. have been developed, and have appeared on the market. Various adapters are known, and used for connection between different audio/video equipment. These adapters are commonly made from wave band switches or wave link switches. Because these switches are passive devices, they cannot automatically set the output signal channel. When in use, the user has to find the accurate output channel for signal output. Because these switches are mechanical devices, they wear quickly with use. There are also known remote-controlled audio/video adapters for controlling the connection between audio/video equipment. These remote-controlled audio/video adapters are convenient in use, however their manufacturing cost is high.

SUMMARY OF THE INVENTION

The present invention has been accomplished under the circumstances in view. It is the main object of the present invention to provide an auto audio/video output circuit with multiple audio/video inputs which receives audio/video input signals from different audio/video equipment, and automatically replaces the previously inputted audio/video signal with the last inputted audio/video signal for output, and automatically catches the previously inputted audio/video signal (if not turned off) when the last inputted audio/video signal is turned off. It is another object of the present invention to provide an auto audio/video output circuit with multiple audio/video inputs which is an electronic circuit without mechanical switch means.

BRIEF DESCRIPTION OF THE DRAWINGS

FIG. 3 shows an output state of the present invention where only one audio/video equipment is turned on.

FIG. 4 shows an output state of the present invention where multiple audio/video equipment are turned on.

DETAILED DESCRIPTION OF THE PREFERRED EMBODIMENT

Figure 1:
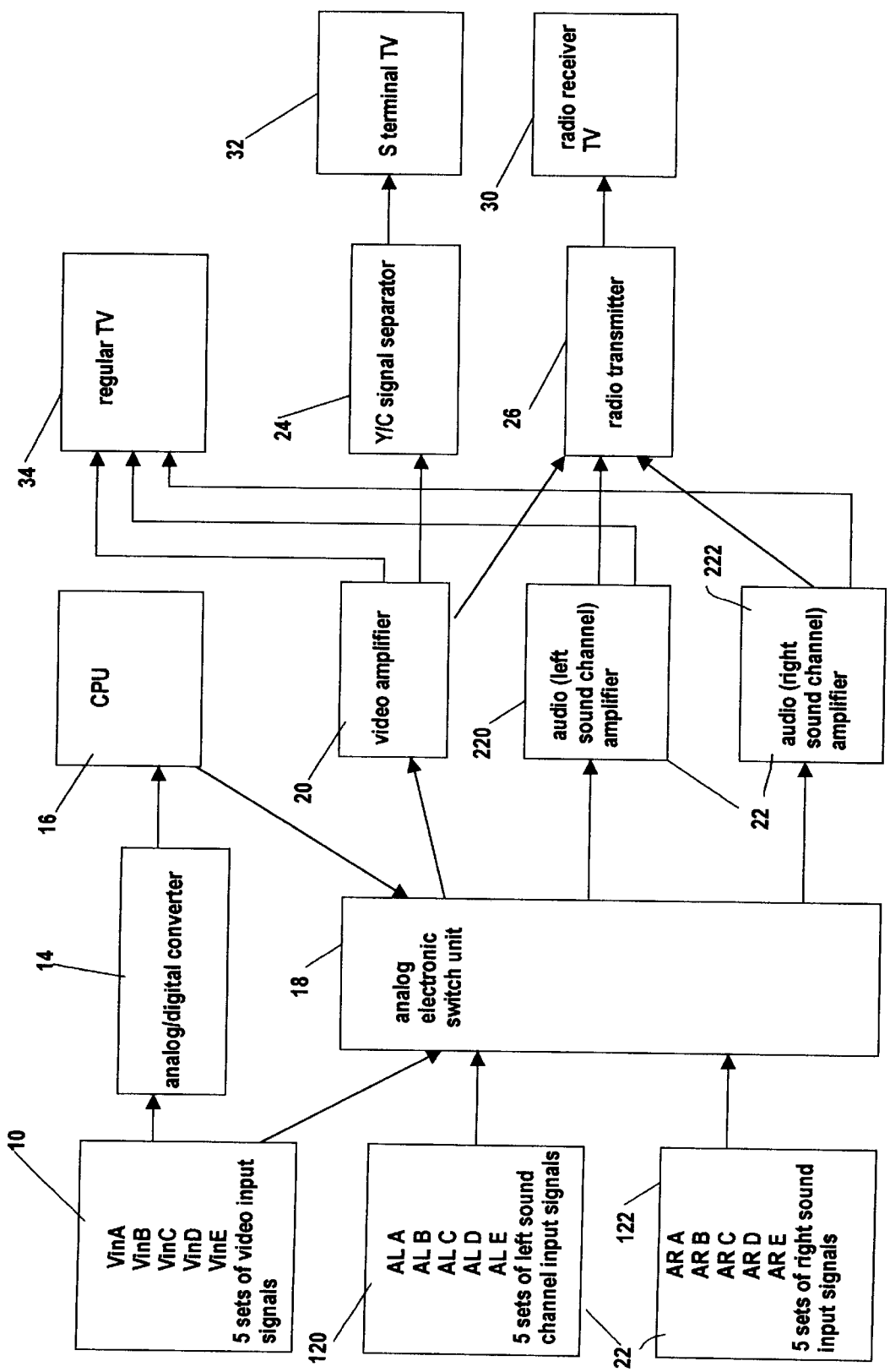
FIG. 1 is a circuit block diagram of the present invention.
Figure 2:
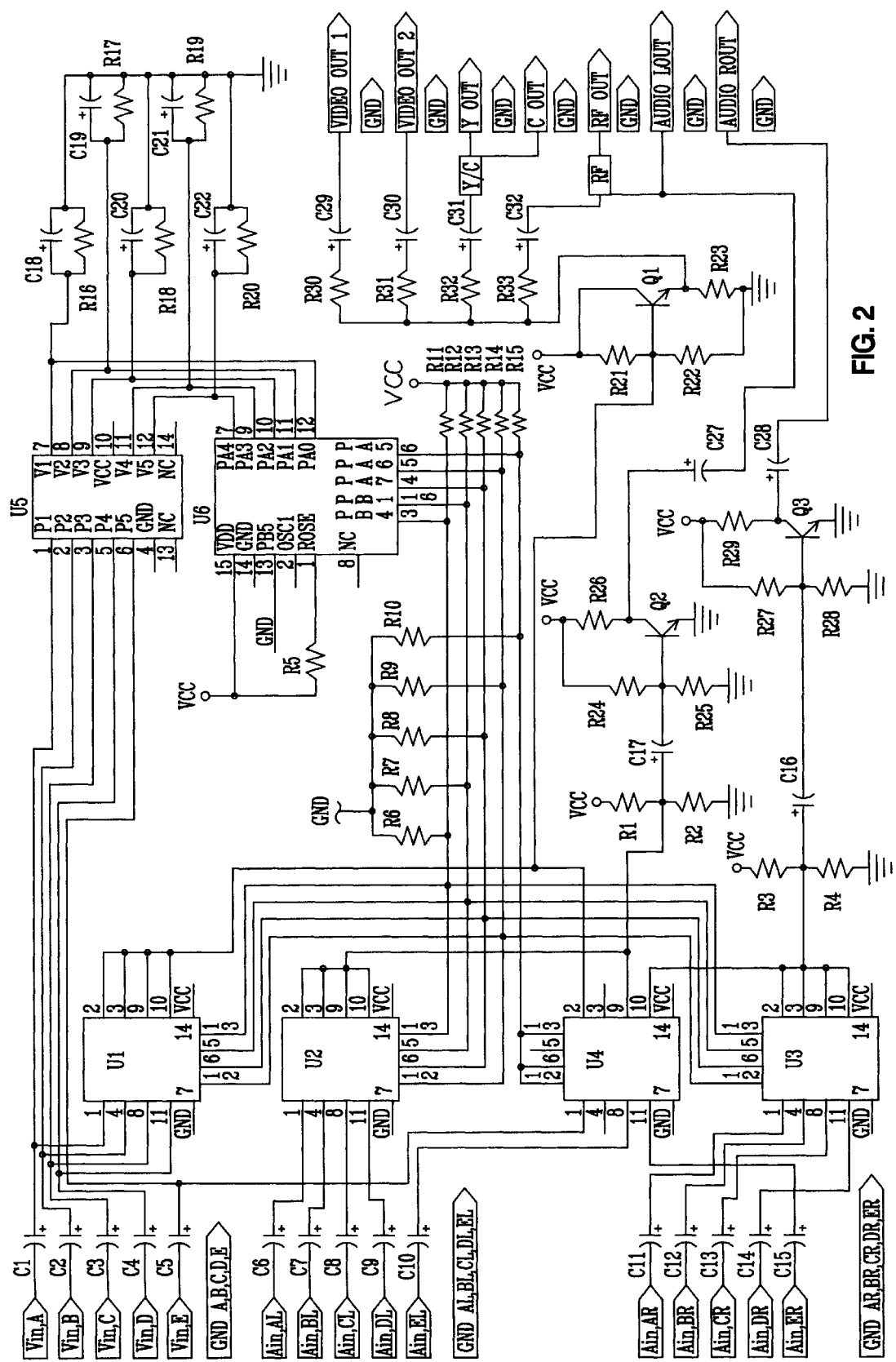
FIG. 2 is a detailed circuit diagram of the present invention.

Referring to FIGS. 1 and 2, an auto auto-video output circuit in accordance with the present invention is generally comprised of a video input interface 10, an audio input interface 12 including a left sound channel input interface 120 and a right sound channel input interface 122, an analog/digital converter 14, a CPU (central processing unit) 16, an analog electronic switch unit 18, a video output amplifier 20, and an audio output amplifier unit 22 including a left sound channel amplifier 220 and a right sound channel amplifier 222. The video input interface 10 has a plurality of input terminals VinA;VinB;VinC;VinD;VinE for receiving video signals from a plurality of audio/video equipment, and a plurality of output terminals respectively connected to input terminals of the analog/digital converter 14 and input terminals of the analog electronic switch unit 18. Video signals from the audio/video equipment are respectively transmitted to the analog/digital converter 14, and converted into corresponding digital signals. The analog/digital converter 14 is comprised of a plurality of analog to digital converting ICs (see U5 in FIG. 2). The analog to digital converting ICs of the analog/digital converter 14 receive video output signals from the output terminals of the video input interface 10. When one analog to digital converting IC of the analog/digital converter 14 receives a video output signal from the corresponding output terminal of the video input interface 10, it provides a high potential output signal to a respective video input pin at the CPU 16 (see U6 in FIG. 2). When several audio/video equipment are turned on, the video signals are transmitted in proper order to the respective video input pins of the CPU 16 through the video input interface 10 via the analog/digital converter 14, and then stored in internal memory means in the CPU 6, and the video signal from the audio/video equipment which was last turned on is selected and processed for output (this will be described further).

The input terminals of the left sound channel input interface 120 and the right sound channel input interface 122 of the audio input interface 12 are respectively connected to the left sound channel output terminals and right sound channel output terminals of the audio/video equipment. The output terminals of the left sound channel input interface 120 and the right sound channel input interface 122 of the audio input interface 12 are respectively connected to the respective input terminals of the analog electronic switch unit 18. Input signals VinAALAARA;VinBALBARB;VinC ALCARC;VinDALDARD;VinEALEARE from the video input interface 10 and the audio input interface 12 are respectively connected to respective input terminals of the analog electronic switch unit 18.

The output terminals of the analog electronic switch unit 18 are respectively connected to the input terminals of the video output amplifier 20, the left sound channel amplifier 220 and the right sound channel amplifier 222. The analog electronic switch unit 18 has a control terminal connected to one output pin of the CPU 16. When the CPU 16 judges one input signal to be the last input signal, it immediately outputs a control signal to the control terminal of the analog electronic switch unit 18, causing the analog electronic switch unit 18 to select the desired video signal left/right sound channel signal for output to the video output amplifier 20 or the left/right sound channel amplifier 220(222).

When the user turns on one audio/video equipment, the signal outputted from the audio/video equipment is detected by the CPU 16, causing the analog electronic switch unit 18 to open the corresponding output terminal, permitting the video signal to be transmitted to the corresponding amplifier.

Referring to FIG. 3 and FIG. 2 again, when only one Av signal (VinAALAARA) is inputted to the analog/digital converter 14, the analog/digital converter 14 catches one segment of the video signal VinA from the inputted Av signal and converts it into a high potential voltage signal, then outputs the high potential voltage signal to the CPU 16, enabling the CPU 16 to memorize the video signal VinA as a first input signal. After the first input signal has been memorized in memory means in the CPU 16, the CPU 16 immediately outputs a high potential to the analog electronic switch unit 18 (the analog electronic switch unit 18 is comprised of switching ICs U1;U2;U3;U4), causing it to output the selected signal VinAALAARA to a regular TV 34 through the amplifiers 20;220;222.

Referring to FIG. 4 and FIG. 2 again, when different audio/video equipment are irregularly turned on at different times, the CPU 16 memorizes the sequences of the inputted video signals (see FIG. 4) and let the last inputted audio/video signals (i.e., number 5) be transmitted the regular TV 34 through the amplifiers 20;220;222 (according to the present embodiment, these amplifiers are transistor amplifier circuits).

Referring to FIG. 1 again a transmitter circuit 26 may be provided and connected to the output terminals of the video output amplifier 20, the left sound channel amplifier 220 and the right sound channel amplifier 222 for signal output by radio to a radio receiver TV 30. Further, a Y/C signal separator 24 may be installed to output amplified signals to a S terminal TV 32.

Figure 5:
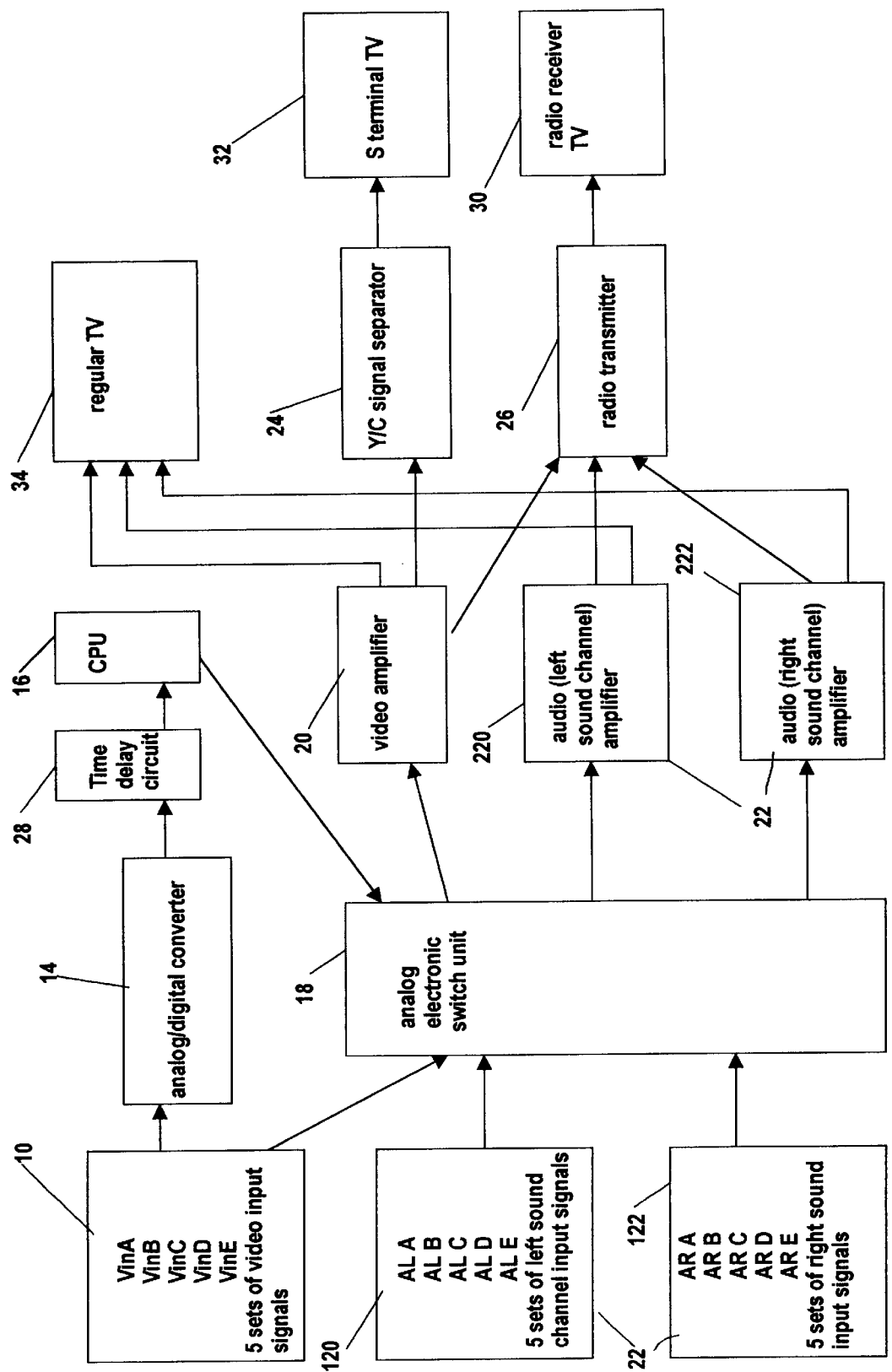
FIG. 5 is a circuit block diagram of an alternate form of the present invention.

FIG. 5 is a circuit block diagram of an alternate form of the present invention, in which a time delay circuit 28 (RC circuit) is connected between the analog/digital converter 14 and the CPU 16 to extend the existing time of the high potential signals by means of a charging discharging operation.

It is to be understood that the drawings are designed for purposes of illustration only, and are not intended as a definition of the limits and scope of the invention disclosed.

What the invention claimed is:

1. An automatic switching audio/video output circuit for automatically selecting one of a plurality of audio/video equipment and comprising:

a video input interface having a plurality of signal input terminals for receiving video signals from a plurality of audio/video equipment, and a plurality of signal output terminals;

at least one audio input interface each having a plurality of signal input terminals for receiving audio signal from a plurality of audio/video equipment and a plurality of signal output terminals;

at least one analog/digital converter respectively connected to the signal output terminals of said video input interface for converting video signals into corresponding digital signals;

a central processing unit (CPU) having a plurality of signal input pins respectively connected to respective signal output terminals of said at least one analog/digital converter for receiving the digital signals from said analog/digital converter, the CPU determining a last digital signal received and generating a control signal through a control signal output pin;

an analog electronic switch unit having a plurality of signal input terminals respectively connected to the signal output terminals of said video input interface and the signal output terminals of said at least one audio input interface, a plurality of signal output terminals, and a control terminal connected to the control signal output pin of said CPU to receive the control signal from said CPU for controlling the closing/opening of the plurality of signal output terminals of said electronic switch unit;

a video output amplifier having a video signal input terminal respectively connected to the signal output terminals of said analog electronic switch unit to receive video signals from said analog electronic switch unit, and a video signal output terminal; and an audio output amplifier having a signal input terminal respectively connected to the signal output terminal of said analog electronic switch unit to receive audio signals from said analog electronic switch unit and a plurality of audio signal output terminals;

whereby the analog electronic switch unit outputs video/audio signals from the video/audio equipment corresponding to the last digital signal determined by the CPU.

2. The automatic switching audio/video output circuit of claim 1, further comprising:

a radio transmitter connected to the signal output terminals of said analog electronic switch unit;

wherein the video signal output terminal of said video output amplifier and the audio signal output terminals of said audio output amplifier are respectively connected to video input terminal and audio input terminals of a TV, to provide an audio/video signal set to the connected TV or a radio receiver TV for output after audio/video signals from audio/video equipment have been inputted into said video input interface and said at least one audio input interface.

3. The automatic switching audio/video output circuit of claim 1, further comprising:

a radio transmitter connected to the signal output terminals of said analog electronic switch unit; and a Y/C signal separator connected to the signal output terminals of said analog electronic switch unit;

wherein the video signal output terminal of said video output amplifier and the audio signal output terminals of said audio output amplifier are respectively connected to video input terminal and audio input terminals of a TV, to provide an audio/video signal set to the connected TV, a radio receiver TV, or a S terminal TV for output after audio/video signals from audio/video equipment have been inputted into said video input interface and said at least one audio input interface.

4. The automatic switching audio/video output circuit of claim 1 further comprising a time delay circuit connected between said at least one analog/digital converter and said CPU to extend the digital signals transmitted from said least one analog/digital converter to said CPU.

5. The automatic switching audio/video output circuit of claim 2 further comprising a time delay circuit connected between said at least one analog/digital converter and said CPU to extend the digital signals transmitted from said least one analog/digital converter to said CPU.

6. The automatic switching audio/video output circuit of claim 3 further comprising a time delay circuit connected between said at least one analog/digital converter and said CPU to extend the digital signals transmitted from said least one analog/digital converter to said CPU.

* * * * *